Feb. 13, 1951 H. E. LIETAERT 2,541,592
INJECTION MOLD AND PRESSURE ACTUATABLE DEVICE
FOR CONTROLLING THE FILLING THEREOF
Filed May 6, 1948

INVENTOR.
Harold E. Lietaert.
BY
Harness, Dickey & Pierce
ATTORNEYS.

Patented Feb. 13, 1951

2,541,592

UNITED STATES PATENT OFFICE 2,541,592

INJECTION MOLD AND PRESSURE ACTUATABLE DEVICE FOR CONTROLLING THE FILLING THEREOF

Harold E. Lietaert, Monroe, Mich., assignor to Monroe Auto Equipment Company, Monroe, Mich., a corporation of Michigan Application May 6, 1948, Serial No. 25,488

4 Claims. (Cl. 18—42)

1

This invention relates to injection molding apparatus, and more particularly to a mold for use with such apparatus having a pressure actuatable device for controlling the filling thereof.

It is an object of this invention to provide a mold of the aforementioned type having a pressure device adapted to be actuated by a predetermined pressure of moldable material injected into the mold so as to insure the proper filling of the mold cavities.

It is a further object of this invention to provide, in a mold of the aforementioned type, a pressure actuatable device, which is connected with a cavity in the mold and is adapted to be connected with the aforementioned injection apparatus in such a manner that the device will be actuated by a predetermined pressure of injected moldable material so as to shut off the injecting mechanism when all of the cavities of the mold are properly filled.

It is a further object of this invention to provide a pressure actuatable device of the aforementioned type which will not become clogged up or rendered inoperative by the moldable material which engages and actuates it.

It is a still further object of this invention to provide, in a pressure actuatable device of the aforementioned type, an efficient and relatively simple mechanism for operating a switch, which in turn controls the injection apparatus which fills the mold.

It is a still further object of this invention to provide an injection mold of the aforementioned type in which a plurality of articles are molded in a more efficient manner than heretofore known in the art so that only a minimum of flash is obtained while at the same time all of the cavities are properly filled.

Other objects of this invention will become apparent from the following detailed description taken in conjunction with the accompanying drawing in which.

Figure 1:
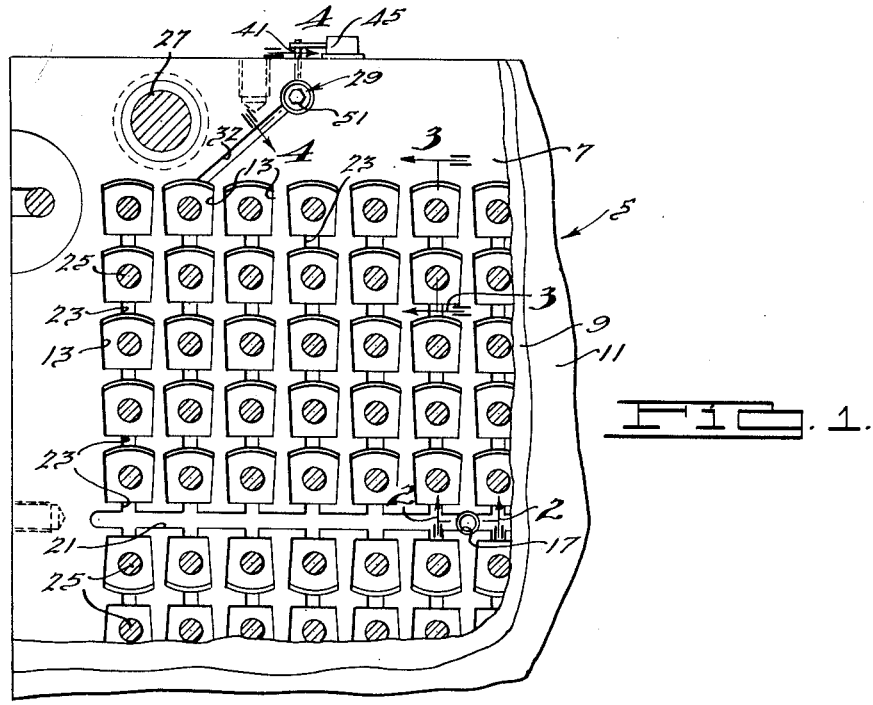
Figure 1 is a fragmentary view partly in section and partly in elevation of a mold embodying the features of this invention.

Referring now to the drawing, it will be seen that a mold 5 is illustrated which includes a cavity plate 7, a stripper plate 9, and a pin retainer

Figure 2:
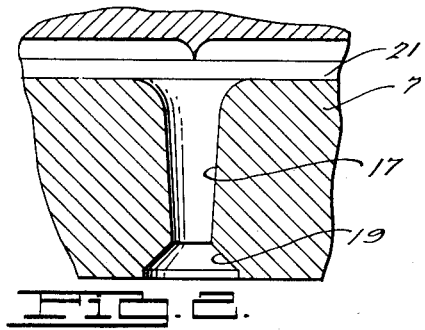
Fig. 2 is an enlarged sectional view of the structure illustrated in Fig. 1, taken along the line 2—2 thereof.

2 plate 11. The cavity plate 7 and stripper plate 9 are provided with a plurality of complemental cavity portions 13 which, when the plates 7 and 9 are moved into engagement, form mold cavities 15 of a predetermined size and shape for molding articles of the same size and shape. The cavities 15 are shown as being arranged in a plurality of vertical and horizontal rows in order that as many articles as possible may be molded at one time. The mold herein illustrated is adapted for use with injection apparatus of any suitable type, and the cavity plate 7 is provided with a passageway or gate 17 at substantially the center thereof, which has the outer end thereof bellmouthed at 19 to receive the nozzle of the injection apparatus, so that any suitable moldable material, such as rubber, plastic, metal, or the like, may be injected into the mold. The cavity plate 7 and stripper plate 9 are provided with a gate 21, which is connected to and extends outwardly from opposite sides of the center injection passageway 17, as can be best seen in Fig. 2. Runners 23 connect the gate 21 to the mold cavities, as can be seen in Fig. 1, so that the moldable material which is injected into the opening 17 will flow through the gate 21 and into the various runners 23 and cavities 15.

Figure 3:
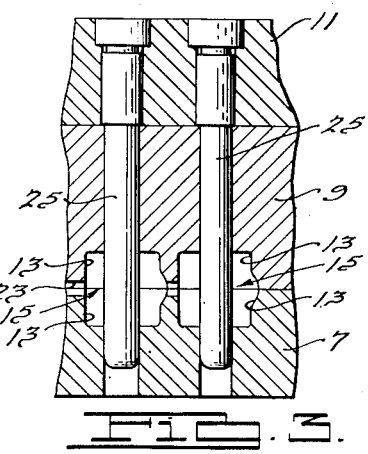
Fig. 3 is an enlarged sectional view of the structure illustrated in Fig. 1, taken along the line 3—3 thereof.
Figure 4:
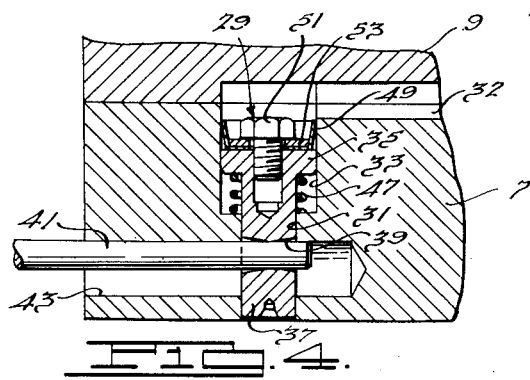
Fig. 4 is an enlarged sectional view illustrated in Fig. 1, taken along the line 4—4 thereof.

The particular mold herein illustrated is adapted to mold rubber articles having a central opening therethrough, and for this purpose the pin retainer plate 11 carries a plurality of core pins 25 which project into the mold cavities as can be best seen in Fig. 3, for the purpose of providing apertures in the molded articles. The mold is likewise provided with conventional dowel pins 27 which are also carried by the pin retainer plate 11 for aligning the various plates of the mold when the same are moved into an engaging relationship during the molding operation.

In order to control the filling of the mold cavities so that all of the cavities will be properly filled and so that only a minimum of flash will be obtained, a pressure actuatable device 29 is provided in the cavity plate 7. In order to accommodate the pressure device 29, the cavity plate is provided with an aperture 31 which is disposed above the upper horizontal row of mold cavities 15 and connected to one of the cavities by a runner 32. The inner portion of the aperture 31 is enlarged or recessed at 33 to accommodate the enlarged head 35 of a plunger 37. The plunger 37 is slidably disposed in the aperture 31 with the head 35 thereof slidably engaging the wall of the recess 33. The plunger 37 adjacent the outer end thereof, is formed with a generally hourglass-shaped opening 39 therethrough, in which is disposed one end of an operating rod 41. The operating rod 41 is shown extending upwardly through a passageway 43 in the cavity plate, and the upper end thereof is operatively connected to a switch 45, in any suitable manner, to perform a result which will hereinafter appear. A coil spring 47 is disposed in the cavity plate recess 33, between the outer wall of the recess 33 and the plunger head 35, so as to normally urge the plunger 37 inwardly in the cavity plate 7 until the operating rod 41 engages the wall of the cavity plate passageway 43 and prevents further inward movement of the plunger.

A metallic cuplike element 49 is disposed in the inner end of the cavity plate recess 33 and is secured to the inner face of the plunger head 35 by means of a cap screw 51 and a washer 53. The cuplike element 49 is formed with its peripheral side wall extending angularly outwardly from the base portion thereof so as to engage and bear against the wall of the cavity plate recess 33. The element 49 is preferably made of a metal which has good bearing characteristics, which is exceptionally strong, and which will resiliently maintain its engagement with the wall of the recess 33. In order to obtain these characteristics, it has been found that materials, such as "Monel" metal or "Chace" metal, are the best suited. The cuplike element 49 prevents the plunger 37 from becoming inoperative or plugged up by the moldable material, such as rubber, as will hereinafter appear.

In operation, the moldable material is injected into the mold, by suitable injection apparatus, through the cavity plate passageway 17. The moldable material flows through the gate 21, runners 23 and cavities 15, into the runner 32 which connects the cavity plate recess 33 with a cavity in the upper row of mold cavities, and finally into the recess 33 so as to contact the pressure device 29. The moldable material fills the cuplike member 49 and the pressure thereof will move the plunger 37 outwardly against the action of the coil spring 47. The outward movement of the plunger 37 actuates the operating rod 41, which in turn actuates the switch 45 which is connected to the injection apparatus, so as to shut off the injection apparatus and stop the further injection of moldable material into the mold. The runner 32 is illustrated as being connected at one end to the upper mold cavity in the next to the last vertical row of cavities so that, by the time the molding material flows through the runner 32 and actuates the pressure device 29, the most remote of the mold cavities will be completely filled, but will not be overfilled so as to produce any substantial flash.

After the mold has been opened, that is, after the stripper plate and cavity plate have been separated so that the molded articles can be removed from the cavities, the coil spring 47 will force the plunger 37 and the cup-shaped element 49 inwardly. The cup-shaped element 49, due to its construction and the fact that it bears against the walls of the recess 33, will force out any of the molded material which is in the recess, and will thereby maintain the recess 33 in an unclogged condition so that the plunger 37 can operate smoothly and easily. If the cup-shaped element 49 were not provided, moldable material would plug up the recess 33 and would prevent the normal sliding movement of the plunger and plunger head 35 in the recess 33 and aperture 31.

While the pressure device of this invention is illustrated in conjunction with a specific type of mold, it will be appreciated that it may be used with various types of molds so as to perform the same results, and it will also be appreciated that the pressure device 29 may be connected with other of the mold cavities instead of the specific one illustrated in the drawing. However, it has been found that the arrangement illustrated is the most efficient and simple for operating the pressure device so as to shut off the injection apparatus at exactly the point where the mold cavities are properly filled. It will likewise be appreciated that the switch 45 may be of any suitable type and may be connected to the outer end of the pressure device operating rod 41 in any suitable manner wherein actuation of the inner end of the operating rod by the plunger will trip the switch and shut off the injection mechanism.

I claim:

1. A pressure device for use in an injection mold, including a plunger adapted to be slidably received in an aperture in the mold, a metallic cup-shaped element rigidly connected to one end of said plunger and having the peripheral wall thereof adapted to bear against the wall of said mold aperture so as to scrape and remove from the wall of said aperture any moldable material thereon upon movement of the plunger and cup-shaped element in one direction, and so as to prevent leakage of moldable material therepast upon movement of the plunger in the opposite direction, a rod operatively connected to said plunger adjacent the opposite end from said cup-shaped element and adapted to be operatively connected to molding apparatus injecting means for controlling the latter, and spring means for resiliently retaining said plunger in a predetermined position in said mold aperture whereby movement of said plunger will actuate said operating rod and injecting means operatively connected therewith.

2. A mold, for use with molding apparatus of the type having means for injecting moldable material into said mold, including a cavity, a pressure device in said mold including a plunger slidably received in an aperture in said mold which is connected with said cavity, a cup-shaped scraping element rigidly connected to one end of said plunger and having the peripheral wall thereof bearing against the wall of said mold aperture and facing in a direction to remove from the wall of said aperture any moldable material thereon upon inward movement of said plunger, and so as to prevent leakage of moldable material therepast upon outward movement of said plunger, a rod operatively connected to said plunger adjacent the opposite end from said cup-shaped element and extending through said mold and adapted to be operatively connected to the molding apparatus injecting means for controlling the latter, and spring means disposed in said mold aperture for resiliently retaining said plunger in a predetermined inwardly disposed position in said mold aperture whereby outward movement of said plunger by a predetermined pressure of moldable material injected into said mold will actuate said operating rod and molding apparatus injecting means so as to properly control the filling of said mold.

3. A mold for use with molding apparatus of the type having means for injecting moldable material into the mold, said mold having a plurality of cavities adapted to be filled by moldable material injected into said mold, a passageway in said mold into which said moldable material is injected, and a pressure responsive device in said mold including a plunger member, actuatable by molding material at a predetermined pressure, to cause movement thereof in said mold and connected to one of said cavities remotely positioned with respect to said injection passage, said pressure device being responsive to a predetermined pressure of injected moldable material in said mold for actuating said injecting means so as to stop the injection of said moldable material and including a scraping member connected with said plunger member for removing moldable material from portions of said mold adjacent said plunger member so that said plunger member can move in said mold and so that its movement will not be prevented by clogging caused by moldable material after the molding operation has been completed.

4. A mold, for use with molding apparatus of the type having means for injecting moldable material into said mold, including a plurality of cavities adapted to be filled by moldable material injected into said mold, a passageway in said mold into which said moldable material is injected, a pressure responsive device in said mold connected to one of said cavities remotely positioned with respect to said injection passage, said pressure responsive device including a plunger slidably received in an aperture in said mold which is connected with said remote cavity, a metal cup-shaped element rigidly connected to one end of said plunger and having the peripheral wall thereof in resilient engagement with the wall of said mold aperture and facing in a direction to scrape and remove from the wall of said aperture any moldable material thereon upon inward movement of said plunger, a rod operatively connected to said plunger adjacent the opposite end from said cup-shaped element and extending through said mold for direct connection with means for controlling the molding apparatus injecting means, and spring means disposed in said mold aperture normally resiliently retaining said plunger in a predetermined inwardly disposed position in said mold aperture, whereby outward movement of said plunger by a predetermined pressure of moldable material injected into said mold will actuate said operating rod and molding apparatus injecting means so as to properly control the filling of said mold.

HAROLD E. LIETAERT.

REFERENCES CITED

The following references are of record in the file of this patent:

UNITED STATES PATENTS

| Number | Name | Date |
| --- | --- | --- |
| 1,674,387 | Campbell | June 19, 1928 |
| 1,924,474 | Wiegand et al. | Aug. 29, 1933 |
| 2,372,833 | Jobst | Apr. 3, 1945 |